Patented Mar. 11, 1952

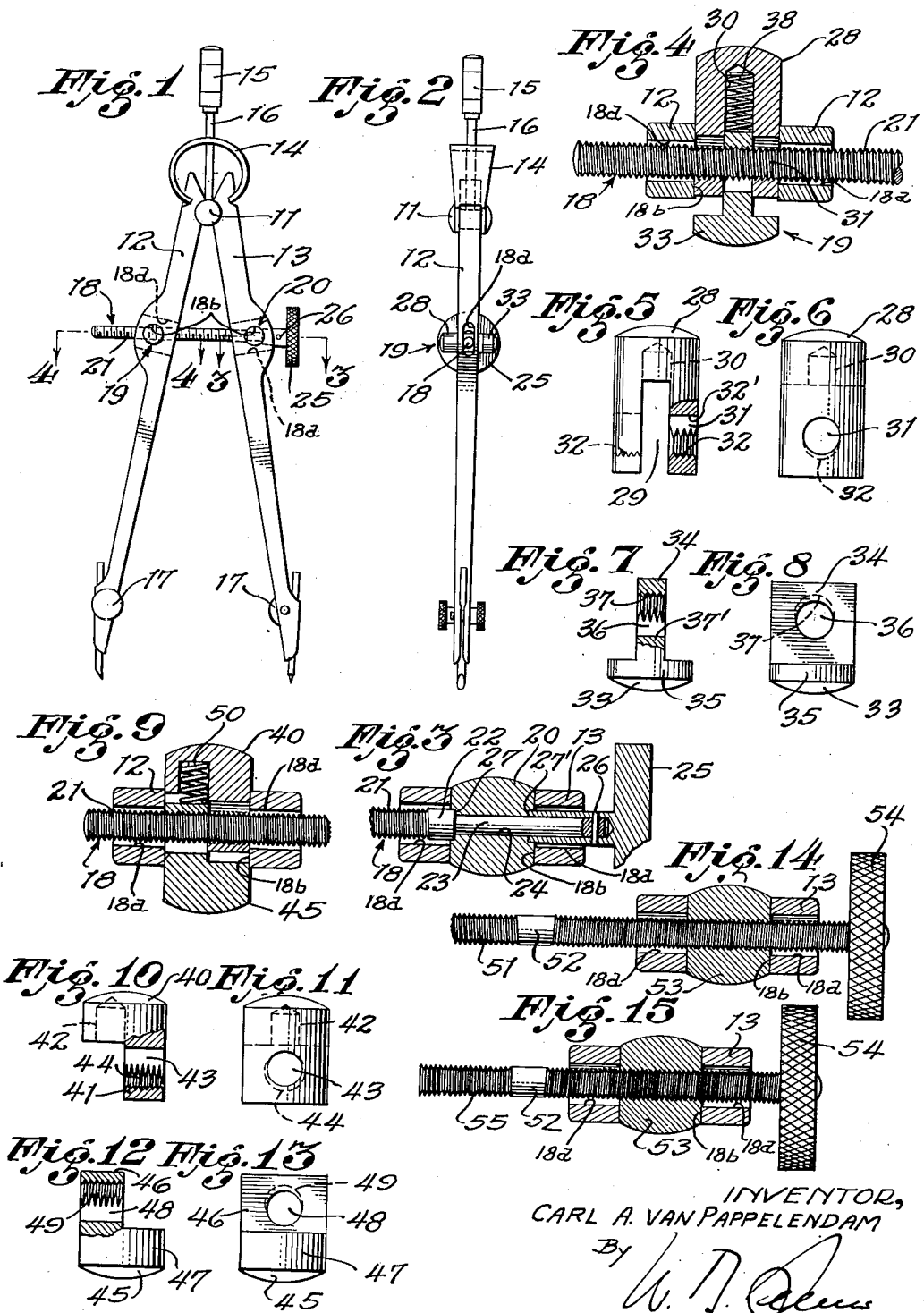

2,588,780

UNITED STATES PATENT OFFICE 2,588,780

COMPASS AND THE LIKE

Carl A. van Pappelendam, Monrovia, Calif.

Application July 11, 1949, Serial No. 103,972

19 Claims. (Cl. 33—154)

My invention relates to new and useful improvements in compasses, dividers, calipers and the like.

For the purpose of illustration, I disclose a compass comprising two legs whose upper ends are pivoted on a cylindrical member against which they are held by a C-shaped spring, an adjusting screw pivoted to said legs and functioning to control the spread, or distance between the lower ends of said legs, and screw clamps at the lower ends of said legs for holding metal points, pencil leads, pens or other accessories. A small handle at the upper end of the compass serves as a convenient means for manipulating it.

An object of my invention is to save a considerable part of the time generally consumed in turning the adjusting screw of a compass or the like to change the spread of the legs.

Another object of my invention is to embody in a compass and the like, the advantage of a quick approximate setting to any required spread within the range of the instrument, and also the advantage of a precise screw adjustment.

Another object of my invention is to provide compasses and the like with an adjusting nut by which the adjusting screw articulates with one of the legs of the compass or the like, said adjusting nut being so constructed that its threads can readily be disengaged from, or engaged with, the threads of the adjusting screw.

Another object of my invention is to provide compasses and the like with a quick adjusting means which is economical to construct, which can be operated easily and quickly, and which is simple and durable.

Another advantage of my invention is that it can readily be embodied in many conventional compasses and the like, without any change in the construction of the instrument, other than to provide the instrument with an adjustable nut.

Another advantage of my invention is that there need be no external connections between the adjusting nut and the compass leg in which it is installed.

My invention has other objects, advantages and features, some of which, with the foregoing will be apparent from the following description and accompanying drawings of a compass embodying certain forms of my invention. It should be understood, however, that the particular embodiments shown and described are chosen for the purposes of exemplification only, since the invention may be embodied in a plurality of forms.

Referring to the drawings:

Figure 1 is an upright front view of a compass embodying my invention;

Figure 2 is an upright side view showing the adjusting nut extending a short distance out from each side of one of the legs;

Figure 3 is a section taken along the line 3—3 in Figure 1;

Figure 4 is a section taken along the line 4—4 in Figure 1;

Figure 5 is a plan view of the rear, or slotted, member of the adjusting nut;

Figure 6 is a side view of the rear member of the adjusting nut shown in Figure 5;

Figure 7 is a plan of the front member of the adjusting nut;

Figure 8 is a side view of the front member of the adjusting nut shown in Figure 7;

Figure 9 is a section showing another form of the adjusting nut and adjacent portions of the leg and screw;

Figure 10 is a plan view of the rear member of this second form of adjusting nut;

Figure 11 is a side view of the rear member shown in Figure 10;

Figure 12 is a plan of the front member of the second form of adjusting nut;

Figure 13 is a side view of the front member shown in Figure 12;

Figure 14 is a section through the leg and a portion of the adjusting screw nearest the adjusting screw thumb-piece, showing a construction differing from that shown in Figure 3; and Figure 15 is a section, similar to Figure 14, showing a construction differing from that shown in Figure 14.

Referring to said drawings, the numeral 11 indicates a cylindrical hinge pin which pivotally connects the upper ends of the legs 12 and 13, said legs being held against the pin by the C-shaped spring 14. A handle 15 is pressed on the shaft 16 which passes through a hole in the spring 14 and is firmly screwed into the hinge pin 11. The lower end of each leg is provided with a clamp operated by a screw 17 which can be used to hold a pencil lead, a steel point, the tang of a suitably designed pen so that circles may be drawn in ink, or the tang of some other accessory.

An adjusting screw 18 extends through a bore 18a in each leg and is articulated relative thereto by means of adjusting nut 19 and cylindrical pin 20, respectively, each of which is rotatable in a bore 18b which intersects 18a and the axis of which is parallel to hinge pin 11. Screw 18 consists of a shaft having an elongated threaded portion 21, and at its end adjacent leg 13 a full diameter, unthreaded portion 22, and an end portion 23, of reduced diameter, rotatably seated in a transverse hold 24 through the pin 20. A thumb-piece 25, by which the screw can be turned, is fitted to the small end 23 of the shaft and is held by means of the small pin 26. A shoulder 27 on the shaft and the end of the thumb-piece 25 at 27' bear in counterbores in the pin 20 so as to prevent end play of the adjusting screw in the pin.

The adjusting nut 19 comprises two pieces, which for convenience I shall refer to as the front and rear members, and a spring. As shown in Figures 4, 5 and 6, the rear member 28 is of cylindrical form bifurcated by a large central slot 29. A blind hole 30 is formed at the inner end of slot 29 which also is intersected by a transverse hole 31. The forward side of the transverse hole 31, that nearest the open end of slot 29, is threaded as at 32 while its rearward side is smooth as shown at 32', thus forming a partly threaded hole. As shown in Figures 4, 7 and 8, the front member 33 may be made from a cylindrical piece the side portions of which are cut away so as to leave a tongue 34 and a cylindrical head 35 at one end. A transverse hole 36 through the tongue is threaded on its rearward side 37, its forward side 37' remaining smooth. To assemble, the helical spring 38 is inserted in the hole 30 in the rear member 28 which is then placed in the hole provided in the leg 12. The tongue 34 of the front member 33 is then placed in the slot 29 of the rear member and firmly pressed against the spring 38 until the holes 31 and 36, through the two members, are in alignment. The threaded portion 21 of the adjusting screw 18, which is of smaller diameter, is now inserted in the aligned holes 31 and 36 and the members 28 and 33 are released. The assembled adjusting screw and adjusting nut are shown in section in Figure 4. It will be noted that the spring 38 operates to separate members 28 and 33 and in doing so forces the threads 32 and 37, respectively, of the transverse holes 31 and 36 of these members into engagement with the threads 21 of adjusting screw 18.

The operation of my compass is simple and rapid. Firmly pressing the members 28 and 33 of the adjusting nut together displaces the threaded sides 32 and 37 from engagement with the threads 21 of the adjusting screw 18 and releases the leg 12 therefrom whereupon the legs 12, 13 can be pivoted freely to approximately any desired spread within the range of the instrument. Also, the sides of the holes 31 and 36 being unthreaded opposite the threaded surfaces 32 and 37, upon being moved into contact with the screw element by the displacement described, provide a smooth guideway for that element so that it is permitted to slide freely as the legs 12 and 13 pivot relative to each other. The displaceable members 28 and 33 at all times maintain the same angular relationship relative to their common central axis as they make sliding contact with each other along flat surfaces. This coupled with the fact that the screw element is enclosed by both holes 31 and 36 insures that the threaded portions 32 and 37 will under all circumstances be guided as to move in parallelism when engaging and disengaging the screw element.

Upon being released the members 28 and 33 of the adjusting nut are forced apart by the spring 38 and the threads 32 and 37 move into engagement with the threads 21 of adjusting screw 18.

An exact accurate setting can then be made by turning the thumb-piece 25 to effect the rotation of screw 18 in threads 32 and 37 of nut 19 and which in turn draws the leg 12 toward or forces it from the leg 13. In short, in using the compass as described large changes in the spread of the legs can be effected rapidly and micrometric changes can be made by the usual thumb screw means.

A modified form of adjusting nut is shown in Figures 9 to 13 in which the rear member is indicated by the numeral 40, the front member by 45, and the helical spring by 50. Instead of a medial slot being cut in the rear member, a hemicylindrical portion is cut away leaving another hemicyclindrical portion 41. The blind hole 42 for the spring 50 is shown asymmetric with the axis of the member 40, and a large hole 43 in portion 41 is partly threaded at 44 on its forward side. The front member 45 also has a hemicylindrical part, indicated at 46, through which passes the hole 48 threaded on the rear side at 49. The assembly and operation of this modified form of my invention is accomplished in the same manner as the form first described. It will be noted that in this embodiment the front and rear members 45 and 40 are identical except for the blind hole 42 seating the spring 40 in the rear member. If preferred the spring can be used with each member in which event they would be identical whereby manufacturing would be simplified.

With the adjusting nuts of Figures 4 to 8, inclusive, and Figures 9 to 13, inclusive, various forms of adjusting screws may be used. In the form shown in Figure 3 both the rough and micro adjustments take place between the screw and the adjusting nut. That is, after the rough adjustment has been obtained with the adjusting nut compressed and it has been released to engage the screw 18, rotation of the latter causes the nut to feed therealong to pivot the legs relative to each other. In this form the screw rotates freely at its reduced cylindrical portion 23 in the pin 20 which does not shift its position longitudinally on the screw.

A second form of adjusting screw is illustrated in Figure 14 and bears the reference character 51. This form is oppositely threaded upon opposite sides of a mid-section 52 between the legs 12 and 13 and is adapted threadedly to engage each leg. A thumb-piece 54 is affixed to the extreme end of screw 51 outside leg 13. The leg 12 is engaged through an adjustable nut as described while the interiorly unthreaded pin 20 of the structure of Figure 3 is replaced by an interiorly threaded pin 53 which feeds along the screw as the latter rotates. As the screw 51 is oppositely threaded where it engages the legs 12 and 13 it follows that the rate of separation will be increased for each rotation of the screw for both the adjustable nut and the pin travel thereon and in opposite directions. Aside from this distinction the operation is as above described.

A third form of adjusting screw is illustrated in Figure 15. Here, as in the embodiment of Figure 14, the screw, indicated by the reference character 55, threadedly engages an interiorly threaded pin at the leg 13. Upon the opposite side of the midsection 52, however, the screw is formed as a rack comprising a series of adjacent concentric grooves or threads instead of a continuous thread as in the screws of Figures 3 and 14. While several threads on the engaging adjusting nut are desirable for durability, a single thread is sufficient for operation. The part of the nut carrying the thread would then be, in effect, a simple pawl. In this case it is not necessary that the circular threads be closely spaced. They can be some distance apart, the micrometric adjustment taking care of the intervals between. As the circular threads can be either grooves or raised threads encircling the screw shaft the hole through the part of the adjustable nut engaging them will be provided with either a V-shaped projection to engage the grooves or a notch to engage the raised thread, as the case may be. It is clear that during the microadjustment obtained by rotating screw 55 in this form the cooperating adjustable nut, which of course is interiorly ground to mesh with the concentric grooves of the screw, will permit the latter freely to rotate but will not travel therealong. The entire relative pivotal movement of the legs 12 and 13 takes place through the pivotal movement of leg 13 as the interiorly threaded pin 53 advances along the screw as the latter rotates. This relationship is the reverse of that found in the embodiment of Figure 3.

It will be noted that in neither of the two forms of my invention described is it necessary for both the rear and front nut members to be threaded. It is sufficient that the hole through either one or the other member be threaded as described to engage the threads of the adjusting screw while the hole through the other member can be left smooth to ride upon the threads of said adjusting screw.

From the foregoing description taken in connection with the accompanying drawings, my invention will be readily understood by those skilled in the art to which the invention appertains. While I have shown and described certain forms of my invention, I desire to have it understood that the forms shown are merely illustrative and that the invention is not to be limited to the details disclosed herein, but is to be accorded the full scope of the appended claims.

I claim:

1. In a device of the class described, the combination of a pair of legs hinged together, an adjusting screw, and a compressible adjusting nut, said compressible adjusting nut comprising a first member of cylindrical form bifurcated by a slot from one end and having a first hole parallel to its axis and opening into the bottom of said slot, and having a second hole through both of its bifurcations and perpendicular to its axis, said second hole being provided with screw threads on the side nearest the free ends of said bifurcations; a second member having a tongue adapted to be positioned in said slot of said first member and having a hole through said tongue, said hole through said tongue being perpendicular to the axis of said second member and threaded on the side nearest the free end of said tongue; and a spring seated in said first mentioned hole in said first member and bearing against said second member, said adjusting screw being positioned through said second mentioned hole of said first member and through said hole in said second member as to be in threaded engagement with the threads in each of said holes when said adjusting nut is uncompressed, and to be free of said threads in each of said holes when said adjusting nut is compressed.

2. In a device of the class described, the combination of a pair of legs hinged together, an adjusting screw, and a compressible adjusting nut, said compressible adjusting nut when uncompressed being in threaded engagement with said adjusting screw and said adjusting nut when compressed being disengaged from said adjusting screw, said compressible adjusting nut comprising a first member of cylindrical form bifurcated by a slot from one end and having a first hole parallel to its axis and opening into the bottom of said slot, and having a second hole through both of said bifurcations and perpendicular to its axis, said second hole being threaded on the side nearest the free ends of said bifurcations; a second member having a tongue adapted to be positioned in said slots of said first member and having a hole through said tongue, said hole through said tongue being perpendicular to the axis of said second member, and threaded on the side nearest the free end of said tongue; and a spring seated in said first mentioned hole in said first member and bearing against said second member.

3. In a device of the class described, the combination of a pair of legs hinged together, an adjusting screw, and a compressible adjusting nut, said compressible adjusting nut comprising a first member of cylindrical form having a recess, a first hole opening into said recess and parallel to the axis of said first member, and a second hole through said first member and perpendicular to the axis thereof, said second hole being threaded on the side farthest from said first hole; a second member having a portion adapted to be positioned in said recess of said first member and having a hole through it, said hole through said second member being perpendicular to the axis of said second member and threaded on the side nearest said first hole in said first member; a spring seated in said first hole in said first member and bearing against said second member, said second mentioned hole in said first member and said hole in said second member being adapted to receive said adjusting screw, said adjusting screw being in threaded engagement with the threads in each of said holes when said adjusting nut is uncompressed, and to be free of said threads in each of said holes when said adjusting nut is compressed.

4. In a device of the class described, the combination of a pair of legs hinged together, an adjusting screw, and a compressible adjusting nut, said compressible adjusting nut when uncompressed being in threaded engagement with said adjusting screw and said adjusting nut when compressed being in disengagement with said adjusting screw, said compressible adjusting nut comprising a first member of cylindrical form having a recess, a first hole opening into said recess and parallel to the axis of said first member, and a second hole through said first member and perpendicular to the axis thereof, said second hole being threaded on the side farthest from said first hole; a second member having a portion adapted to be positioned in said recess of said first member and having a hole through it, said hole through said second member being perpendicular to the axis of said second member and threaded on the side nearest said first hole in said first member; and a spring seated in said first hole in said first member and bearing against said second member.

5. In a device of the class described, first and second legs pivotally connected, an adjusting rotary screw element extended through each leg and between said legs at a distance from the pivotal axis, a rotatable element seating said screw element in each leg and having its axis parallel to the pivotal axis, one of said rotatable elements having relatively displaceable members each encircling said screw element to form a guideway therefor and being interiorly threaded for a portion of said guideway to engage and seat the threads of said screw element in certain positions, extending upon opposite sides of the leg in which it is positioned, said displaceable members being manually movable between positions to engage and to disengage said screw element.

6. In a device of the class described, first and second legs pivotally connected, an adjusting rotary screw element extended through each leg and between said legs at a distance from the pivotal axis, a rotatable element seating said screw element in each leg and having its axis parallel to the pivotal axis, one of said rotatable elements having relatively displaceable members each formed with guide holes for said screw element at least one of which is threaded on one of its sides, said members extending upon opposite sides of the leg in which they are positioned, a spring normally urging said displaceable members to engage the threaded portions of their holes with said rotary screw element, said displaceable members being relatively movable under manually exerted oppositely directed forces to disengage said rotary element to permit of free pivotal movement of said legs.

7. The construction recited in claim 6 characterized in that said relatively displaceable members are hemicylindrical and are juxtapositioned to make sliding contact and in that their ends extended upon opposite sides of said leg are cylindrical.

8. The construction recited in claim 6 characterized in that said rotatable element threadedly seats said screw element in each of said legs, said screw element being oppositely threaded at its extensions through said legs to effect their movement in opposite directions upon its own rotation.

9. The construction recited in claim 6 characterized in that said rotatable element threadedly seats said screw element in each of said legs, screw element being formed with a discontinuous circular thread in its extension engageable with the one of said rotatable elements having relatively displaceable members and with a continuous thread in its extension engageable with the other of said rotatable elements.

10. The construction recited in claim 6 characterized in that said rotary screw element is unthreaded in its extension through one of said rotatable elements for rotation without longitudinal displacement.

11. The construction recited in claim 6 characterized in that said rotary screw element is threaded in its extension through said rotatable element including the relatively displaceable members and in that at least one of said displaceable members threadedly engages said rotary screw element.

12. The construction recited in claim 6 characterized in that said rotary screw element seats threadedly in each of said rotatable elements.

13. The construction recited in claim 6 characterized in that said rotary screw element is formed with a continuous thread in its extension seating one of said rotatable elements, and is formed with discontinuous circular threads in its extension seating the other rotatable element.

14. In a device of the class described, first and second legs pivotally connected, an adjusting rotary screw element extended through each leg and between said legs at a distance from the pivotal axis, a rotatable element seating said screw element in each leg and having its axis parallel to the pivotal axis, one of said rotatable elements having relatively displaceable members extending upon opposite sides of the leg in which it is positioned, said members of said one rotatable element being formed with aligned holes through which said screw element extends, said holes being of greater size than the diameter of said screw element and threaded on opposite sides to engage said element, a spring normally retaining said displaceable members in threaded engagement with said screw element, said displaceable members being relatively movable under manually exerted oppositely directed forces to disengage their threaded sides from said screw element and to engage their unthreaded sides therewith to guide said screw element as it slides therethrough upon the relative pivotal movement of said legs.

15. The construction recited in claim 14 characterized in that said relatively displaceable members are formed with overlapping ends making sliding contact sufficient to prevent relative angular movement between said members, and in that said spring comprises a coil spring positioned between said members.

16. In a device of the class described, the combination of a pair of legs pivotally connected, an adjusting screw to vary the angular relationship of said legs extended therebetween, and an adjustable nut seating said screw in one of said legs, said nut comprising: a pair of members rotatably seated in said one leg for angular adjustment about a major axis parallel to the pivotal axis of said legs and abutting each other in slidable engagement for relative displacement in the direction of said major axis only, resilient means exerting a moving force on said members in the direction of said major axis, said nut being formed with a passage extended through said members across said major axis and which is greater in its interior dimension parallel to said major axis than the diameter of said screw, said passage being threaded upon one side in one of said members and upon its opposite side in the other of said members, said threaded sides being spaced in the direction of said major axis, characterized in that said resilient means exerts a force between said members to move the threaded portions of said passage into engagement with said screw, and in that upon the relative displacement of said members by a manually applied force in opposition to the force of said resilient means the unthreaded portions of said passage provide a guideway for said screw to slide through upon the relative pivotal movement of said legs.

17. In a device of the class described, the combination of a pair of legs pivotally connected, an adjusting screw to vary the angular relationship of said legs extended therebetween, and an adjustable nut seating said screw in one of said legs, said nut comprising: a pair of members rotatably seated in said one leg for angular adjustment about a major axis parallel to the pivotal axis of said legs and each formed with surfaces extended parallel to said major axis abutting in slidable relationship a similar surface on the other member, resilient means exerting a moving force on said members in the direction of said major axis, said nut being formed with a passage extended through said members across said major axis and which is greater in its interior dimension parallel to said major axis than the diameter of said screw, said passage being threaded upon one side in one of said members and upon its opposite side in the other of said members, said threaded sides being spaced in the direction of said major axis, characterized in that said resilient means exerts a force between said members to move the threaded portions of said passage into engagement with said screw, and in that upon the relative displacement of said members by a manually applied force in opposition to the force of said resilient means the unthreaded portions of said passage provide a guideway for said screw to slide through upon the relative pivotal movement of said legs.

18. In a device of the class described, the combination of a pair of legs pivotally connected, an adjusting screw to vary the angular relationship of said legs extended therebetween, and an adjustable nut seating said screw in one of said legs, said nut comprising: a pair of members rotatably seated in said one leg for angular adjustment about a major axis parallel to the pivotal axis of said legs, one of said members being formed with a slot extended in the direction of the major axis of said nut and the other of said members being formed with a tongue extended into said slot, said tongue and slot relationship providing for relative longitudinal displacement between said members in the direction of said major axis and preventing relative angular movement between said members, resilient means exerting a moving force on said members in the direction of said major axis, said nut being formed with a passage extended through said members across said major axis and which is greater in its interior dimension parallel to said major axis than the diameter of said screw, said passage being threaded upon one side in one of said members and upon its opposite side in the other of said members, said threaded sides being spaced in the direction of said major axis, characterized in that said resilient means exerts a force between said members to move the threaded portions of said passage into engagement with said screw, and in that upon the relative displacement of said members by a manually applied force in opposition to the force of said resilient means the unthreaded portions of said passage provide a guideway for said screw to slide through upon the relative pivotal movement of said legs.

19. The construction recited in claim 18 characterized in that said resilient means comprises a spring carried by said one member at the end of said slot in abutting relationship to the adjacent end of the tongue of said other member.

CARL A. van PAPPELENDAM.

REFERENCES CITED

The following references are of record in the file of this patent:

UNITED STATES PATENTS

| Number | Name | Date |
|---|---|---|
| 299,722 | Bellows | June 3, 1884 |
| 1,300,047 | Thomas | Apr. 8, 1919 |
| 2,401,321 | Schwend | June 4, 1946 |
| 2,422,286 | Bartusch | June 17, 1947 |

FOREIGN PATENTS

| Number | Country | Date |
|---|---|---|
| 411,619 | France | Apr. 14, 1910 |